United States Patent [19]

Kunihiro

[11] Patent Number: 5,245,427
[45] Date of Patent: Sep. 14, 1993

[54] MOTION IMAGE DATA COMPRESSION CODING APPARATUS AND IMAGE DATA COMPRESSION CODING METHOD

[75] Inventor: Hideto Kunihiro, Osaka, Japan

[73] Assignee: NEC Corporation, Tokyo, Japan

[21] Appl. No.: 838,341

[22] Filed: Feb. 20, 1992

[30] Foreign Application Priority Data

| Feb. 21, 1991 | [JP] | Japan | 3-049148 |
| Feb. 21, 1991 | [JP] | Japan | 3-049149 |
| May 31, 1991 | [JP] | Japan | 3-155481 |
| Jun. 14, 1991 | [JP] | Japan | 3-53341[U] |

[51] Int. Cl.[5] ........................................ H04N 7/133
[52] U.S. Cl. ........................................ 358/133; 358/136
[58] Field of Search ............... 358/13, 133, 135, 136, 358/138

[56] References Cited

U.S. PATENT DOCUMENTS

| 4,979,038 | 12/1990 | Guichard | 358/135 |
| 5,073,821 | 12/1991 | Juri | 358/13 |

FOREIGN PATENT DOCUMENTS 62-313850 12/1987 Japan.
2-184242 7/1990 Japan.

Primary Examiner—Howard W. Britton
Attorney, Agent, or Firm—Sughrue, Mion, Zinn, Macpeak & Seas

[57] ABSTRACT

A motion image data compression coding apparatus and an image data compression coding method capable of smoothing compressed data among frames are disclosed. A data amount of compressed data is obtained by a hybrid coding of a combination of an orthogonal transform such as a discrete cosine transform, a quantization and a variable length coding of motion image data of one frame. A quantization step size is expressed by a product of a scaling factor f and quantization matrix factors q. The scaling factor f is determined from a code amount produced up to the preceding frame, a target code amount and an AC level of the transform factors of the present frame. Prior to the quantization and the variable length coding, a code amount actually resulted by the same coding is detected, and by considering the actual code amount, the scaling factor f for the last quantization is corrected.

10 Claims, 11 Drawing Sheets

FIG. 2A $u$

| | | | | | | | |
|---|---|---|---|---|---|---|---|
| 10 | 11 | 11 | 12 | 12 | 13 | 14 | 14 |
| 11 | 11 | 12 | 12 | 13 | 13 | 14 | 16 |
| 11 | 12 | 12 | 13 | 14 | 14 | 16 | 18 |
| 12 | 12 | 13 | 14 | 14 | 16 | 18 | 20 |
| 12 | 13 | 14 | 14 | 16 | 18 | 20 | 22 |
| 13 | 14 | 14 | 16 | 18 | 20 | 22 | 25 |
| 14 | 14 | 16 | 18 | 20 | 22 | 25 | 28 |
| 14 | 16 | 18 | 20 | 22 | 25 | 28 | 30 |

| | | | | | | | |
|---|---|---|---|---|---|---|---|
| 16 | 18 | 20 | 22 | 26 | 30 | 36 | 44 |
| 18 | 20 | 22 | 26 | 30 | 36 | 44 | 50 |
| 20 | 22 | 26 | 30 | 36 | 44 | 50 | 60 |
| 22 | 26 | 30 | 36 | 44 | 50 | 60 | 70 |
| 26 | 30 | 36 | 44 | 50 | 60 | 70 | 82 |
| 30 | 36 | 44 | 50 | 60 | 70 | 82 | 90 |
| 36 | 44 | 50 | 60 | 70 | 82 | 90 | 98 |
| 44 | 50 | 60 | 70 | 82 | 90 | 98 | 98 |

| TARGET CODE AMOUNT (K BIT) | AC LEVEL (×10000) | | | | | | | | | |
|---|---|---|---|---|---|---|---|---|---|---|
| | 5 | 7.5 | 10 | 12.5 | 15 | 17.5 | 20 | 22.5 | 25 |
| 10 | 90 | 100 | 120 | 125 | 130 | 135 | 140 | 145 | 150 |
| 20 | 40 | 60 | 80 | 85 | 90 | 100 | 120 | 125 | 130 |
| 30 | 20 | 25 | 30 | 45 | 75 | 80 | 90 | 95 | 100 |
| 40 | 15 | 19 | 23 | 35 | 60 | 65 | 70 | 78 | 85 |
| 50 | 13 | 15 | 19 | 23 | 30 | 40 | 50 | 58 | 65 |
| 60 | 11 | 13 | 36 | 19 | 23 | 30 | 35 | 42 | 50 |
| ---------- | ---------- | | | | | | | | | ---------- |
| 300 | 1 | 1 | 1 | 2 | 2 | 2 | 2 | 3 | 3 |

MOTION IMAGE DATA COMPRESSION CODING APPARATUS AND IMAGE DATA COMPRESSION CODING METHOD

BACKGROUND OF THE INVENTION

The present invention relates to a motion image data compression coding apparatus for compressing an amount of data by successively carrying out an orthogonal transform, a quantization and a variable length coding of motion image data of one frame and also relates to an image data compression coding method for use in the motion image recording and reproducing system.

DESCRIPTION OF THE PRIOR ART

In a prior art now, a recording and reproducing system a frame structure of motion image data for games, educations or the like is coded for compressing the data amount, and the coded data are recorded onto or reproduced out of a large capacity recording medium such as a CD-ROM or the like.

Conventionally, a high performance coding system among the one of various coding systems for data compression, is a hybrid coding system. In this system, a frame of image data is equally divided into blocks, which undergoes an orthogonal transform such as discrete cosine transform (DCT) or the like, a quantization, and a variable length coding (VLC). The details of this hybrid coding system is disclosed in Japanese Patent Applications No. 87-313850 "DCT-VQ compressed motion image data transmission system" and No. 90-184242 "DCT compressed motion image data recording and reproducing system".

In this conventional hybrid coding system, with a change of the data amount and with the compression efficiency depending upon the image conditions, the data amount (produced code amount) after compression is also changed every frame. Hence, a relatively large capacity buffer circuit and a complex control system for the buffering are required for reproducing.

In the coding, step described above, in order to reduce the buffer memory size and simplify the synchronization control in the reproducing step, it is desirable to make smooth, one frame of compressed data or as flat as possible and in order to realize this, a variety of methods have been proposed. For example, one frame of entire code amount is calculated, and the step size of the quantization is dynamically varied.

However, a conventional data smoothing method such as the dynamic variation of the quantization step size, is still insufficient with respect to the data smoothing, and a more effective smoothing method may be required.

SUMMARY OF THE INVENTION

In view of the problems of the prior art it is therefore an object of the present invention to provide a motion image data compression coding apparatus which is capable of smoothing a produced code amount among frames and compressed data among the frames.

It is another object of the present invention to provide an image data compression coding method, which is capable of smoothing a produced code amount among frames and compressed data among the frames.

In accordance with one aspect of the present invention, there is provided a motion image data compression coding apparatus, comprising orthogonal transform means for carrying out an orthogonal transform of motion image data of a frame structure to obtain transform coefficients; quantization means for quantizing the transform coefficients sent from the orthogonal transform means through a buffer memory with a variable quantization step size to obtain quantized data; variable length coding means for carrying out a variable length coding of the quantized data to output compressed coded data to an output terminal; code amount calculator means for calculating a code amount of the compressed coded data produced every frame; preceding quantization means for quantizing the transform coefficients of one frame read out of the buffer memory with a second variable quantization step size to obtain second quantized data prior to the quantization of the quantization means and the variable length coding of the variable length coding means; preceding variable length coding means for carrying out a second variable length coding of the second quantized data to output second compressed coded data; preceding code amount calculator means for calculating a second code amount of the second compressed coded data produced every frame; AC level detector means for detecting an AC level reflecting an amplitude size of AC components of the transform factors every one frame; target code amount calculator means for calculating a target code amount as a target value of a code amount of a next frame on the basis of the code amount calculated by the code amount calculator means and an instruction input from an external part; preceding step size set means for calculating a scaling factor from the calculated value of the target code amount calculator means and the detected value of the AC level detector means, calculating a second quantization step size from a product of the scaling factor and quantization matrix factors set for the AC components of the transform factors and setting the second quantization step size to the preceding quantization means; and step size set means for calculating a quantization step size from the calculated value of the target code amount calculator means, the detected value of the AC level detector means and the calculated value of the preceding code amount calculator means and setting the quantization step size to the quantization means.

The AC level detector means can detect a sum of absolute values of levels of the AC components of the transform coefficients as the AC level.

In accordance with another aspect of the present invention, there is provided a motion image data compression coding apparatus for compressing a data amount by successively carrying out an orthogonal transform, a quantization and a variable length coding of motion image data of one frame structure, comprising AC level detector means for detecting an AC level reflecting an amplitude size of AC components of transform coefficients produced by the orthogonal transform every one frame; interframe difference detector means for detecting an interframe difference G of the AC level between a preceding frame and a present frame, detected by the AC level detector means; code amount error detector means for detecting a code amount error difference D between a code amount of compressed coded data produced every frame by the variable length coding and a target code amount as a target value of the code amount; addition code amount error detector means for adding up the code amount error differences D from a head frame through the present frame to detect an addition code amount error Z; initial value set means for setting an initial value of a scaling factor f relating to a quantization step size from a combination of the AC level of the detected transform coefficients of the head frame and the target code amount; scaling factor adjusting means for adjusting the scaling factor f set for the preceding frame on the basis of the code amount error D, the code amount error Z and the interframe difference G; and calculator means for calculating the quantization step size in the quantizing from a product of the scaling factor f adjusted by the scaling factor adjusting means and quantization matrix factors q set for the AC components of the transform coefficients.

The scaling factor adjusting means can include an adjusting factor calculator means for calculating an adjusting factor $\alpha$ for adjusting a scaling factor set for the present frame by multiplying the scaling factor f for the preceding frame by $(1+\alpha)$ according to the following formula $$\alpha = D/k1 + Z/k2 + G/k3$$

wherein k1, k2 and k3 are constants.

In accordance with a further aspect of the present invention, there is provided an image data compression coding method for use in an image data compression coding apparatus for compressing a data amount by a hybrid coding of a combination of a block dividing within a frame, a discrete cosine transform within the block, a quantization and a variable length coding of image data of one frame structure, comprising the steps of a first stage for setting an upper limit code amount F0 of one frame and an upper limit code amount B0 of one block according to an instruction input from an external part; a second stage for calculating a code amount B1 of effective data except ineffective data including zero data continuing up to a block end by the hybrid coding of the blocks within one frame, and carrying out a midway stop of the effective data for an excess part of each block in which the code amount B1 exceeds the upper limit code amount B0; and a third stage for adding up all code amounts of the effective data of all blocks within the frame including the midway stop blocks after coding to obtain a total code amount F1 of one frame, comparing the total code amount F1 with an upper limit code amount F0, and either when F1≧F0, carrying out a construction of compressed data by using the formed effective data of all blocks including the midway stop blocks, or when F1<F0, while the upper limit code amount B0 for the midway stop blocks is increased until either F1 becomes at least F0 or there becomes no midway stop block by the increase of the upper limit code amount B0, carrying out the construction of the compressed data by using the effective data including the increased parts.

The second stage can further include calculating a number of ineffective data groups convertible into effective data (ESC code) of a predetermined code length, the ineffective data groups appearing in the form of a predetermined number of continuing ineffective data within each block, and the third stage can further include, when the construction of the compressed data of the one frame is finished before the total code amount F1 reach the upper limit code amount F0, converting the ineffective data groups of the block into the effective data (ESC code) until either F1 becomes at least F0 or the construction of the compressed data of the block is finished.

In accordance with still another aspect of the present invention, there is provided a motion image data compression coding apparatus, comprising discrete cosine transform means for, while each frame of image data of one frame structure is equally divided into a plurality of blocks, carrying out a discrete cosine transform of pixel data within each block to obtain transform coefficients; quantization means for quantizing the transform coefficients to obtain quantized data; variable length coding means for carrying out a variable length coding of the quantized data to obtain compressed coded data; code amount calculator means for calculating a code amount of the compressed coded data within the frame; and controller means for setting a target code amount of a target value of the code amount and a proper minimum quantization step size for the quantization as initial values, and, while gradually increasing the quantization step size with a predetermined step, repeating the quantization in the quantization means and the variable length coding in the variable length coding means until the code amount becomes at most the target code amount.

The apparatus can further comprise interframe difference detector means for detecting an interframe difference of correlation of a pattern between preceding and present frames, and when the detected interframe difference is smaller than a predetermined value, the controller means sets either a last quantization step size obtained for the preceding frame or a predetermined step smaller in quantization steps size than the last quantization step size as the initial value in place of the minimum step size.

BRIEF DESCRIPTION OF THE DRAWINGS

The objects, features and advantages of the present invention will become more apparent from the consideration of the following detailed description, taken in conjunction with the accompanying drawings, in which:

FIGS. 2A and 2B show quantization matrix factors for luminace and chrominance signals, respectively, to be used for quantization in the apparatus shown in FIG. 1;

FIG. 5 is shows a prediction table for determining an initial value of a scaling factor f from an AC level of the head frame and a target produced code amount in the apparatus shown in FIG. 4;

DESCRIPTION OF THE PREFERRED EMBODIMENTS

Figure 1:
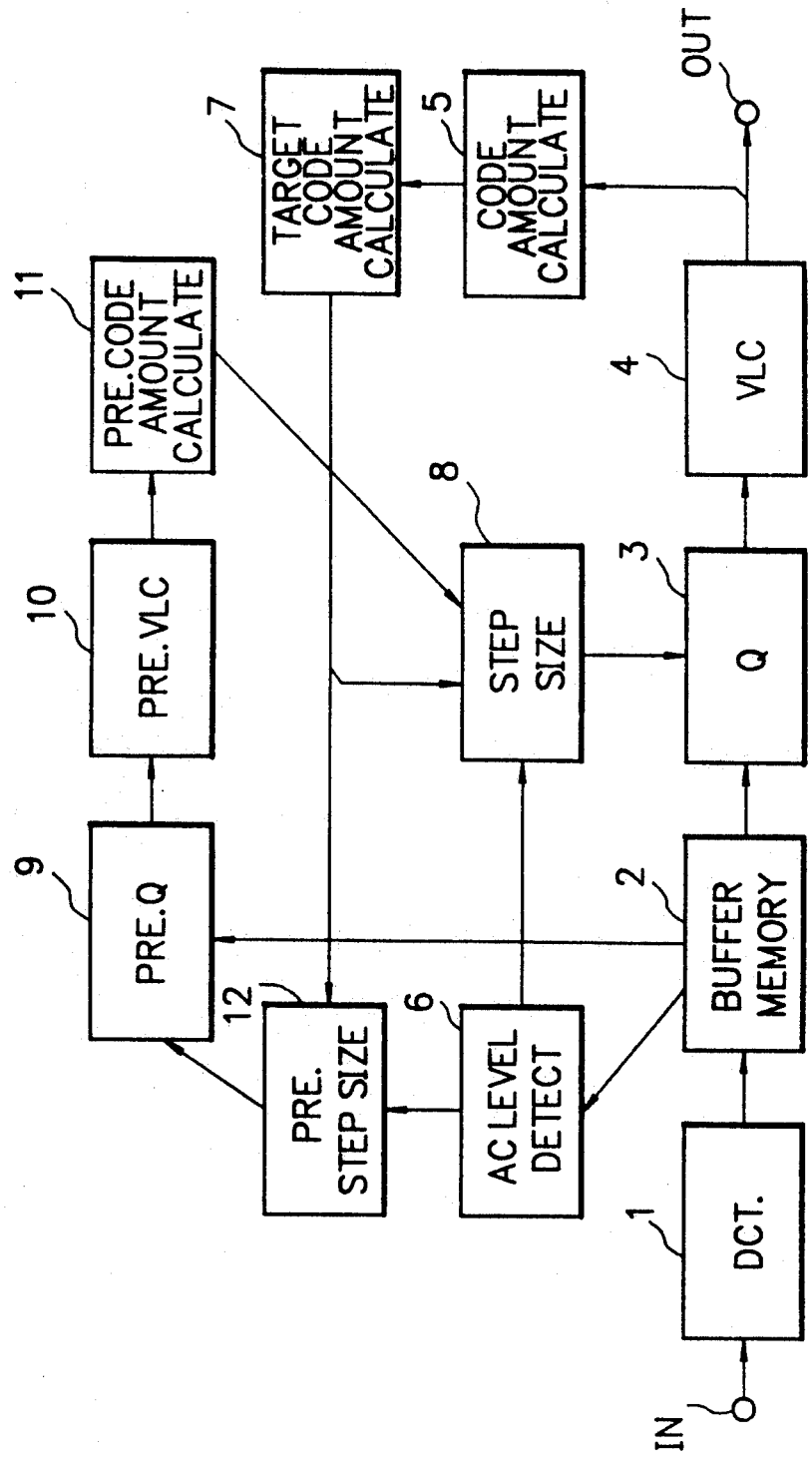
FIG. 1 is a block diagram of a motion image data compression coding apparatus according to a first embodiment of the present invention.

Referring now to the drawings, wherein like reference characters designate like or corresponding parts in the drawings and thus the repeated description thereof can be omitted for brevity, FIG. 1 shows the first embodiment of a motion image data compression coding apparatus according to the present invention.

As shown in FIG. 1, the motion image data compression coding apparatus comprises a DCT (discrete cosine transform) part 1 coupled to an input terminal IN of motion image data to be compressed, a frame buffer memory 2, a quantization (Q) part 3 of a variable step size, a variable length coding (VLC) part 4 connected to an output terminal OUT, a produced code amount calculator 5, an AC level detector 6, a target produced code amount calculator 7, a step size set part 8, a preceding quantization part 9, a preceding variable length coding part 10, a preceding produced code amount calculator 11 and a preceding step size set part 12.

In this embodiment, in the DCT part 1, the motion image data of the frame structure supplied from the input terminal IN are divided into a plurality of blocks for every one frame unit, and a discrete cosine transform is carried out for every block to obtain transform efficient groups including the AC and DC components. This discrete cosine transform is carried out in a conventional manner, as disclosed in the aforementioned Japanese Patent applications No. 87-313850 and No. 90-184242. The transform coefficients output from the DCT part 1 are sent to the quantization part 3 through the frame buffer memory 2 and are quantized with a variable step size being dynamically changed according to the produced code amount and the like. For as to this quantization method, a vector quantization method as disclosed in Japanese Patent application No. 87-313850 is not used, but rather a usual scalar quantization method as disclosed in Japanese Patent application No. 90-184242. The quantized data output from the quantization part 3 is converted into variable length codes in the variable length coding part 4, and the obtained variable length codes are outputted to the produced code amount calculator 5 and to a recording device such as a CD-ROM via the output terminal OUT.

In the produced code amount calculator 5, one frame of code amount produced by a hybrid coding of a combination of the aforementioned discrete cosine transform, the quantization of the variable step size and the variable length coding is summed with the code amount up to the present frame to calculate the produced code amount, and the calculation result is sent to the target produced code amount calculator 7. In the target produced code amount calculator 7, a target produced code amount to be produced for the following one frame is calculated by the produced code amount calculator 5 and an instruction given from an external part and the result is output to the step size set part 8 and the preceding step size set part 12.

In the AC level detector 6, one frame of the discrete cosine transform coefficients $k(u,v)$ read out of the frame buffer memory 2 are input, prior to the preceding quantization, in the preceding quantization part 9, and a sum P of absolute values of all AC components not including except DC components is calculated to detect it as an AC level of its frame according to the following formula.

$$P = \Sigma\Sigma |k(u, v)| \quad (1)$$

The detected AC level is fed to the step size set part 8 and the preceding step size set part 12.

In the quantization part 3, with the variable quantization step size determined by the step size set part 8, the transform coefficient read out of the frame buffer memory 2 is quantized. Now, assuming that the input to the quantization part 3 is A and the quantization step size is Qs, the output A' from the quantization part 3 is represented by the following formula.

$$A' = A/Qs \quad (2)$$

In the quantization of the discrete cosine transform coefficients, as the quantization step size Qs is enlarged, the code amount (bit sum) of the compressed data after the variable length coding is reduced and the data compression rate is raised. This is the reason why as the level of the quantization step size Qs is increased, the output A' of the quantization part 3 is decreased and why as the lower the level of the output A' of low appearance frequency in the following variable length coding part 4 is decreased the bit number of the code allotted is shortened. As described above, as the quantization step size Qs is enlarged, the data compression rate is increased, and on the other hand contrary, as the quantization noise is increased, the image quality of the reproduced image is diminished. Hence, although it is necessary to determine the quantization step taking into account in consideration of the data compression rate and the image quality deterioration allowance, the control and smoothing of the produced code amount are also considered in the compression coding system according to the present invention.

As to the motion image data, from the physiological characteristics of a viewer, it is known that the higher the space frequency of the AC component, the lower the image quality deterioration by the quantization noise which can be allowed. In this embodiment, the quantization step size Qs is determined by taking into account the above-described visual characteristics so as to be a large value as the space frequency of the AC component becomes higher. Hence, the quantization step size Qs is disintegrated into a quantization matrix factor q which depends on an order of a space harmonic and a quantization scaling factor f, as represented by the following formula $$Qs = q \cdot f/k \quad (3)$$

wherein k is constant.

First, the quantization matrix factor q depends on only the order (u, v) of the space harmonic and is determined to a fixed value which increases as the order (u, v) of the space harmonic increases, as shown in FIGS. 2A and 2B. For example, as shown in FIG. 2A, a quantization matrix factor q for a luminance signal (Y) is determined to be a relatively small value, and as shown in FIG. 2B, another quantization matrix factor q for a chrominance signal (R-Y, B-Y) for which image quality deterioration is inconspicuous is determined to a relatively large value. The dynamic control of the quantization step size Qs is practiced by the dynamic control of the quantization scaling factor f in the produced code amount calculator 5.

Figure 3:
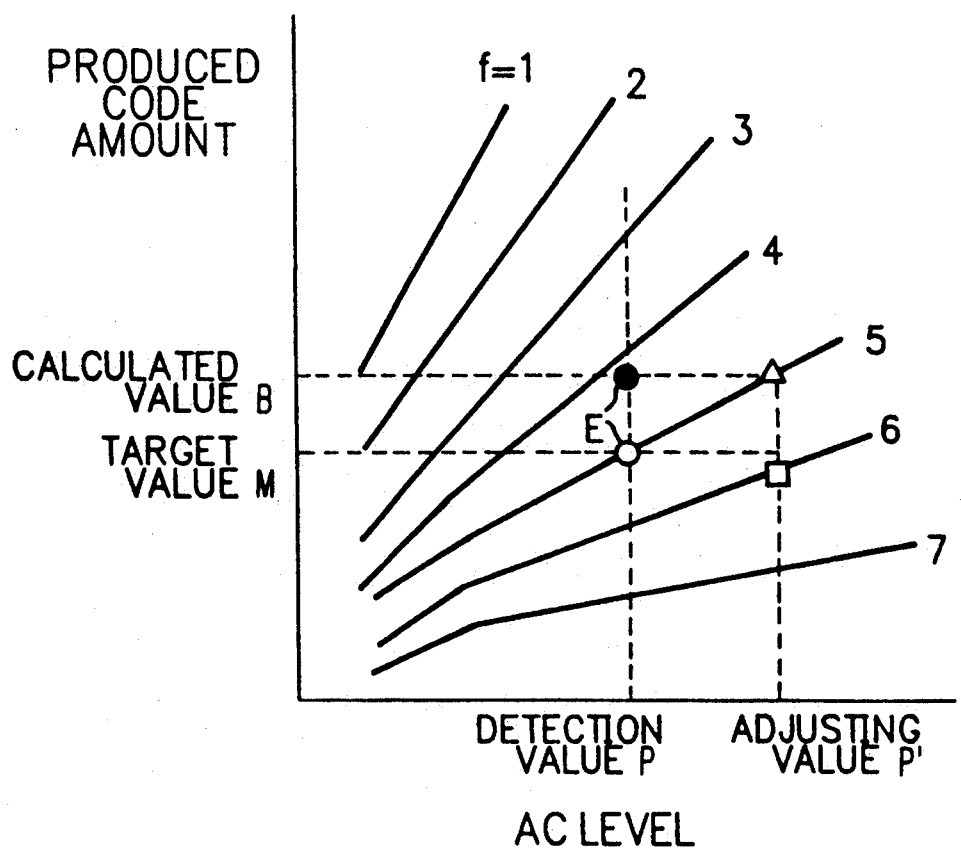
FIG. 3 is a graphical representation of characteristics to be used for determining a scaling factor from an AC level of one frame and a target produced code amount in the apparatus shown in FIG. 1.

Next, as shown in FIG. 3, the quantization scaling factor f is determined to be a value which not only decreases, at a certain AC level as the target produced code amount increases, but also increases at a certain target produced code amount, as the AC level of the discrete cosine transform coefficient increases. This is the reason why with the increase of the AC level, the amount of the data to be quantized increases, and the increase of the bit amount of the compressed data after the variable length coding is repressed to smooth the same. As described above, by determining the quantization step size Qs which increases with the increase of the AC level, even when the motion image pattern becomes fine to increase the AC level, the total bit amount of the compressed image data after the variable length coding can be maintained almost to a predetermined value.

In the target produced code amount calculator 7, on the basis of the calculation result of the produced code amount calculator 5 and the instruction fed from the external portion, the target produced code amount to be produced for the next one frame is calculated as follows.

From the input terminal IN, a total number F0 of the frames are supplied to the DCT part 1 at a fixed frame rate, for example, 30 frames/second. The required time for the data compression by the hybrid coding, that is, the total required time for the recording or reproducing, becomes F0/30 seconds. Further, a part of the input frames to be recorded is removed at a predetermined thinning rate to exclude from the compression object in the DCT part 1 and thus a frame rate and a bit rate of the compressed image data output from the output terminal OUT are Fr and Br, respectively. Hence, a total number F1 and a total bit amount Bt of the frames after the data compression by the coding are expressed by the following formulas respectively.

$$F1 = Fr(F0/30) \tag{4}$$

$$Bt = Br(F0/30) \tag{5}$$

As the coding of the data is begun, the calculations of the total number F1 of the coded frames and the total bit amount Bt produced by the coding are started, and that these two reach F2 and Bc, respectively, at the point when the compression of a certain frame is finished, a remaining frame number F3 and a remaining produced allowable bit amount Bn of the compression object are obtained by the following formulas.

$$F3 = F1 - F2 \tag{6}$$

$$Bn = Bt - Bc \tag{7}$$

When an allowable value of the bit amount produced by the compression of the next frame is defined as a target produced code amount Bm, the target produced code amount Bm is obtained by the following formula.

$$Bm = Bn/F3 \tag{8}$$

The calculation of the target produced code amount Bm is performed on the basis of the total bit amount Bc calculated in the produced code amount calculator 5, the frame rate instructed from the external portion, the bit rate and the aforementioned formulas.

As described above, with the quantization step size Qs set up by the step size set part 8, the quantization is executed in the quantization part 3 and then the variable length coding takes place in the variable length coding part 4. However, due to the incompleteness of the characteristics shown in FIG. 3 and the like, the actual produced code amount is shifted from the target value, and a variation of the produced code amounts among the frames can arise.

In this embodiment, in order to avoid the produced code amount variation among the frames, prior to the final coding by the step size set part 8, the quantization part 3 and the variable length coding part 4, a preceding coding by the preceding step size set part 12, the preceding quantization part 9, and the preceding variable length coding part 10 are carried out. In this preceding coding, the step size is determined by the preceding step size set part 12 on the basis of the detected value obtained in the AC level detector 6 and the calculated value obtained by the target produced code amount calculator 7. The code amount actually produced by the preceding coding is calculated in the preceding produced code amount calculator 11, and the calculation result is fed to the step size set part 8.

In the step size set part 8, the step size determined by the detected value obtained in the AC level detector 6 and the calculation value obtained in the target produced code amount calculator 7, that is, the step size set up in the preceding quantization, is corrected on the basis of the error E between the calculation value in the preceding produced code amount calculator 11 and the target produced code amount, and the corrected step size is set up in the quantization part 3. One example of this correction method will be described as follows.

That is, as exemplified in FIG. 3, from an intersect (a white circle mark in FIG. 3) between a detected value of an AC level and a target produced code amount, 5 as a scaling factor f is settled, and then a preceding quantization and a preceding variable length coding are carried out by the preceding quantization part 9 and the preceding variable length coding part 10, respectively, to obtain an error E (as shown by a dark circle mark) of which the calculation value in the preceding produced code amount calculator 11 exceeds the target value. Such an error occurrence is deemed to be attributed to the weakness of the relationship between the AC level and the scaling factor f, and the detected value of the AC level is adjusted to a value (adjusting value) imparting an intersect (a triangular mark) between a characteristic curve of scaling factor 5 and the calculated value. Accordingly, scaling factor 6 nearest to an intersect (a rectangular mark) between the adjusting value and the target produced code amount is determined on the final quantization.

In this embodiment, as described above, the two systems of the quantization part and the variable length coding part for the final and preceding codings, are provided, and the final coding for the present frame and the preceding coding for the following frame are simultaneously processed to enable shortening of the processing time. However, in case a hardware scale reduction is preferred over the processing time reduction, the quantization part, the variable length coding part and the like can be used in common for the final and preceding codings by a time-sharing operation in multiple.

In this embodiment, as described above, the produced code amounts among the frames can be smoothed and therefore cost of a reproducing part side is reduced can be possible.

Figure 4:
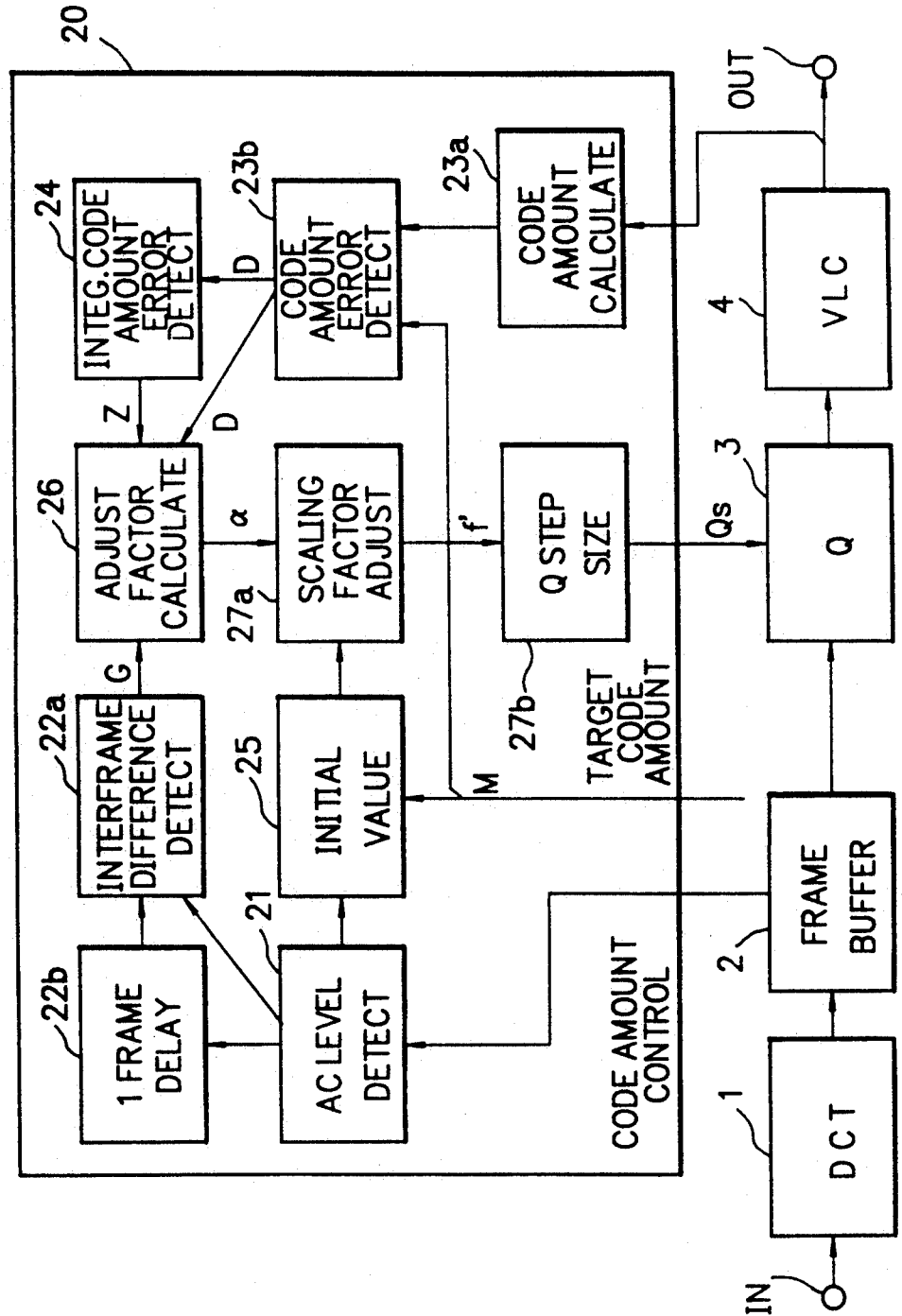
FIG. 4 is a block diagram of a motion image data compression coding apparatus according to a second embodiment of the present invention.

FIG. 4, shows the second embodiment of the motion image data compression coding apparatus according to the present invention, having the same construction as the first embodiment shown in FIG. 1, except that a code amount controller 20 is provided in place of the members 5 to 12 of the first embodiment.

In this embodiment, the code amount controller 20 dynamically controls a variable quantization step size to be set up in a quantization part 3 on the basis of AC components, a target code amount, a produced code amount and so forth so as to keep one frame of code amount produced by a hybrid coding of a combination of a DCT, a quantization and a variable length coding in the vicinity of a target produced code amount to be set to the same value for all frames. In the code amount controller 20, a dynamic control of a quantization step size Qs can be realized by a dynamic control of a quantization scaling factor f.

The code amount controller 20 comprises an AC level detector 21, an interframe difference detector 22a, a one frame delay 22b, a produced code amount calculator 23a, a produced code amount error detector 23b, an integration produced code amount error detector 24, an initial value set part 25, an adjusting factor calculator 26, a scaling factor adjustor 27a and a quantization step size set part 27b.

The AC level detector 21 reads one frame of transform factors out of the frame buffer memory 2 and calculates the sum of the absolute values of all AC components to detect it as the AC component of its frame. The interframe difference detector 22a subtracts the present frame of the AC component G(n) directly sent from the AC level detector 21 from the preceding frame of the AC component G(n−1) fed from the AC level detector 21 through the one frame delay 22b to calculate an interframe difference G of the AC component and outputs the obtained interframe difference G to the adjusting factor calculator 26. The produced code amount calculator 23a calculates the actually produced code amount (bit sum of the data after the compression coding) B of the frames and outputs the calculation result B to the produced code amount error detector 23b. A target code amount M predetermined in advance as a target value is sent to the produced code amount error detector 23b and the initial value set part 25. The produced code amount error detector 23b subtracts the target code amount M from the actual produced code amount B fed from the produced code amount calculator 23a to obtain a subtracted value (B−M) and outputs the subtracted value (B−M) as a produced code amount error D to the integration produced code amount error detector 24 and the adjusting factor calculator 26. The integration produced code amount error detector 24 integrates the produced code amount error D from the coding start head frame to the preceding frame to obtain an integrated produced code amount error Z to be sent to the adjusting factor calculator 26.

The adjusting factor calculator 26 receives the interframe difference G, the produced code amount error D and the integrated produced code amount error Z for the interframe difference detector 22a, the produced code amount error detector 23b and the integration produced code amount error detector 24, respectively, and calculates an adjusting factor $\alpha$ for adjusting the scaling factor predetermined for the preceding frame to obtain a scaling factor for the present frame as follows $$\alpha = D/k1 + Z/k2 + G/k3 \quad (9)$$

wherein k1, k2 and k3 are constants. The adjusting factor calculator 26 outputs the obtained adjusting factor $\alpha$ to the scaling factor adjustor 27a.

On the other hand, the initial value set part 25 receives the AC level of the transform factor detected for the head frame in the AC level detector 21 and the target code amount M and determines the initial value of the scaling factor f from a table shown in FIG. 5, containing a combination of the received two values, to output the initial value of the scaling factor f to the scaling factor adjustor 27a.

The scaling factor adjustor 27a multiplies the scaling factor f for the preceding frame by $(1+\alpha)$ to obtain a scaling factor f' for the present frame in the following formula $$f' = (1+\alpha)f \quad (10)$$

and outputs the obtained scaling factor f' to the quantization step size set part 27b.

The quantization step size set part 27b prepares the quantization step size Qs from the scaling factor f' sent from the scaling factor adjustor 27a and the quantization matrix factors q as exemplified in FIGS. 2A and 2B according to formula (3) and outputs the obtained quantization step size Qs to the quantization part 3.

Then, in the quantization part 3, in respect to the head frame to be compression-coded, the quantization is carried out with the quantization step size Qs set up as described above in the scaling factor adjustor 27a. For the following frames to the head frame, the adjusting factor calculator 26 calculates another adjusting factor $\alpha$ again from the interframe difference G, the produced code amount error D and the integrated produced code amount error Z according to formula (9). The scaling factor adjustor 27a obtains another scaling factor from another adjusting factor $\alpha$ and the quantization step size set part 27b produces another quantization step size Qs to carry out the quantization in the quantization part 3 in the same manner as described above.

Figure 6:
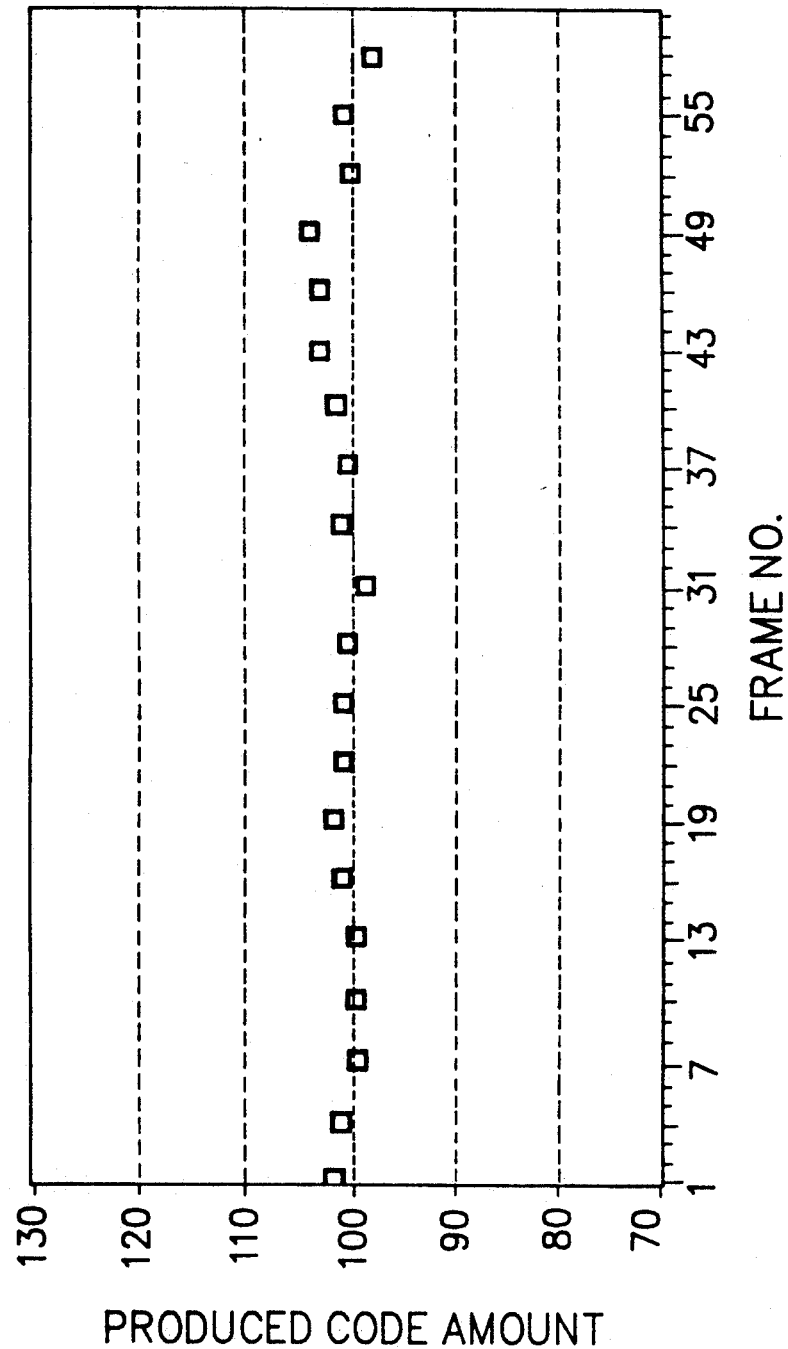
FIG. 6 is a graphical representation showing a result of a compressed produced coding in the apparatus shown in Fig. 4.

FIG. 6 illustrates the result of the compression coding in the motion image data compression coding apparatus shown in FIG. 4. In FIG. 6, the horizontal and vertical axes exhibit the frame number and the calculation value of the actually produced code amount (K bit) for each frame, respectively. In this embodiment, the FIGS. 2A and 2B and FIG. 5 are used for the quantization, and the target produced code amount is determined to be 100 kbits. The constants k1, k2 and k3 in formula (9) are set to 10000, 4000 and 5000, respectively. Further, as the motion data, the original video signals which are thinned out to ⅓ of the total frames are used, and as to the AC level, the sum of the absolute values of all AC components is used.

Figure 7:
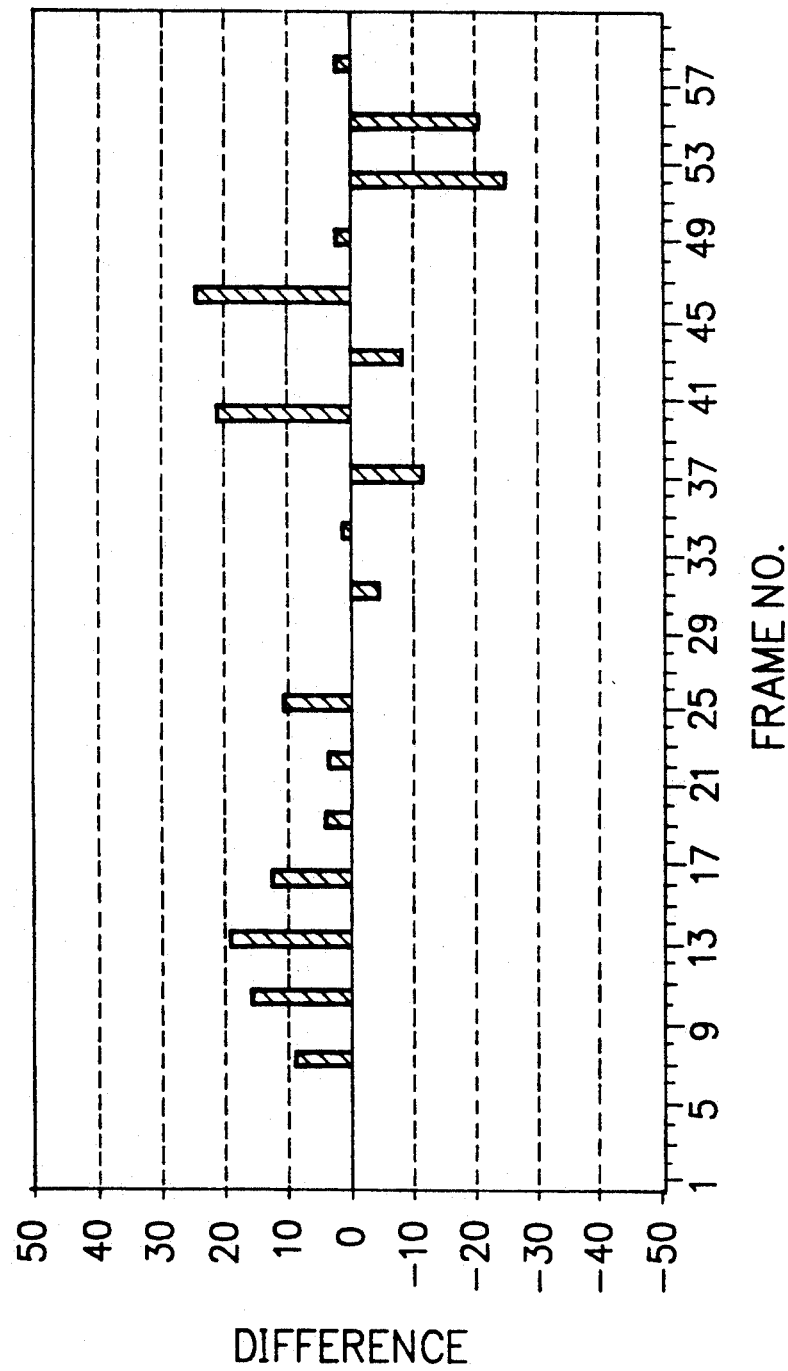
FIG. 7 is a graphical representation showing a variation result of an interframe difference G of an AC component corresponding to the result shown in FIG. 6.

FIG. 7 shows the variation of the interframe difference G of the AC component with reference to the frame number. Since the original video signals are thinned out to ⅓ of all frames, the adjacent frames to be subjected to the compression coding are aligned at an interval of three times as many as the original frame interval, and a fairly large interframe difference G is caused. In spite of the changes of the code amount and the compression efficiency suggested by the occurrence of such a large interframe difference G of the AC component, a good smoothing can be realized, as shown in FIG. 6.

Figure 8:
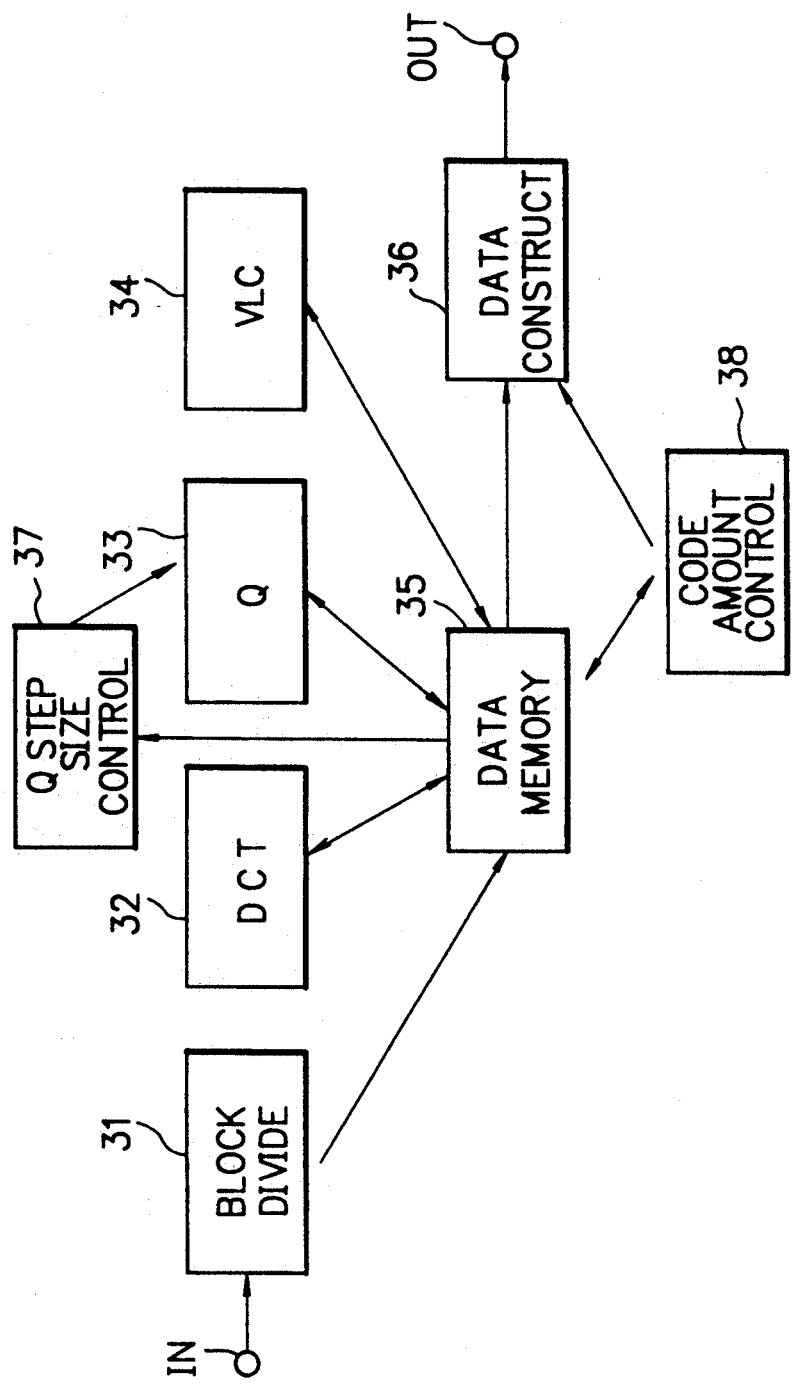
FIG. 8 is a block diagram of a motion image data compression coding apparatus according to a third embodiment of the present invention.

In FIG. 8, there is shown the third embodiment of the motion image data compression coding apparatus according to the present invention. In this embodiment, the motion image data compression coding apparatus comprises a block divider 31 connected to an input terminal IN of motion image data to be compressed, a DCT part 32, a quantization (Q) part 33, a variable length coding (VLC) part 34, a data memory 35, a data construction part 36 connected to an output terminal OUT, a quantization step size controller 37 and a code amount controller 38.

In this embodiment, the digital motion image data of the frame structure to be compressed are supplied every frame unit to the block divider 31 through the input terminal IN and are equally divided into blocks having a size of 8×8 pixels in the block divider 31 while the divided motion image data are stored every block unit into the data memory 35. The DCT part 32 reads the divided motion image data every block unit out of the data memory 35 and carries out a two-dimensional discrete cosine transform of the data to obtain transform coefficient groups. The obtained transform coefficient groups are stored in the data memory 35. The quantization part 33 reads the transform coefficient groups out of the data memory 35 and quantizes the transform factor groups at a step size based on an instruction output from the quantization step size controller 37. The quantized data are stored in the data memory 35. The variable length coding part 34 reads the quantized data out of the data memory 35 and carries out the variable length coding where the larger the appearance frequency, the shorter the code which is allotted. The variable length coded data are stored in the data memory 35.

The quantization step size controller 37 reads the variable length coded data of the blocks out of the data memory 35 and adds up only the effective data of the variable length coded data except the ineffective data through all blocks within one frame. The quantization step size controller 37 also compares one frame of the summed value with a predetermined value. In this embodiment, the ineffective data mean means the data of zero continuing to the end of the block, but the zero data appearing before the ineffective data are dealt with as the effective data. The above-described ineffective data are basically removed when the compressed data are constructed and are exceptionally converted into effective data (ESC code) of a predetermined code length to be included into the compressed data. This conversion from the ineffective data to the effective data will be hereinafter described in detail.

When the sum value of the above-described one frame of the effective data is greater than over the predetermined value, the quantization step size controller 37 allows the quantization part 33 to increase the desired value of the quantization step size corresponding to the excess amount. On the contrary, when the sum value of the one frame of the effective data is less than the predetermined value, the quantization step size controller 37 controls the quantization part 33 to reduce a certain value of the quantization step size corresponding to the insufficient amount. Generally, since, as the absolute value of the quantized data level is small, its appearance frequency is high, when the increase of the quantized step size brings about the reduction of the absolute value of the quantized data, the data amount after the variable length coding is reduced. In turn, when the reduction of the quantized step size increases the absolute value of the quantized data, the data amount after the variable length coding is increased.

Figure 9:
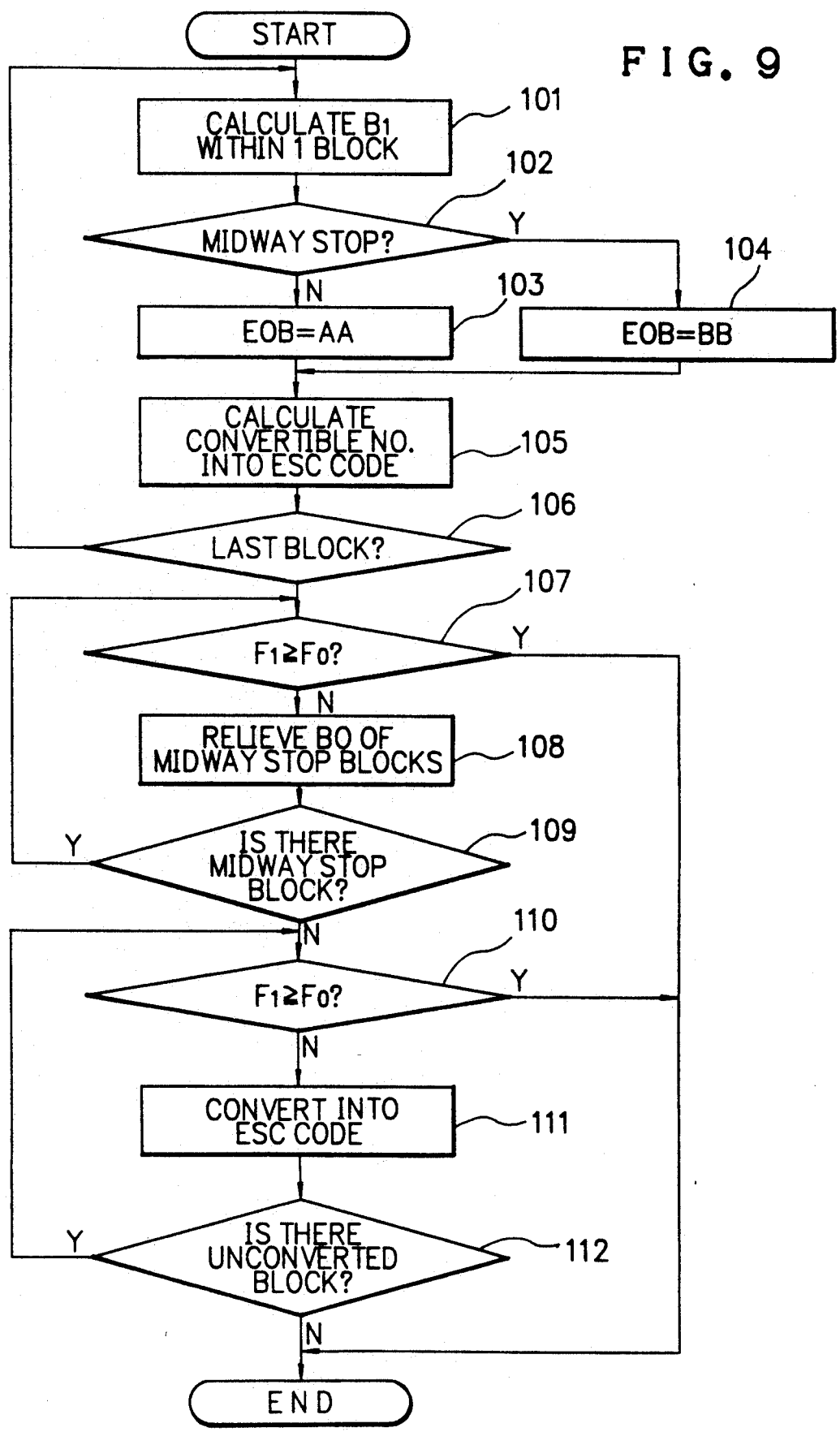
FIG. 9 is a flow chart of a code amount smoothing process in a code amount controller shown in FIG. 8.

FIG. 9 shows a process for carrying out the code amount control of the variable length coded data read out of the data memory 35 in the code amount controller 38. Prior to the processing of each frame, the code amount controller 38 calculates the upper limit code amount F0 of one frame and the upper limit code amount B0 of one block on the basis of an image size, a frame rate and a bit rate input from an external portion via an input part (not shown) and sets the obtained code amounts F0 and B0 in a register included within the code amount controller 38, in advance.

When the code amount control operation is started, the code amount controller 38 calculates a code amount B1 of effective data within a head block and compares the calculated code amount B1 with the upper limit code amount B0 of one block in step 101. Depending on the comparison result, B1>B0 or B1≦B0, the code amount controller 38 determines whether the operation is stopped midway (Y) or not (N) in step 102. That is, when B1>B0, the code amount controller 38 determines that it is necessary to stop midway the operation of the effective data when the code amount of the effective data within the block exceeds the upper limit code amount B0 and sets a code BB as the EOB code indicating the end of this block in step 104. Alternately, when B1≦B0, the code amount controller 38 determines that it is unnecessary to stop midway the operation and determines a code AA as the EOB code indicating the end of this block in step 103.

Next, the code amount controller 38 calculates the number of the ineffective data groups which contain 16 numbers within each block and is convertible into an ESC (escape) code of 12 bit width and stores the calculation result in step 105. That is, it is impossible to convert the ineffective data containing less than 16 numbers into the ESC code, but the ineffective data group continuing at least 16 though less than 32 numbers can be converted into one ESC code, and the ineffective data group continuing at least 32 though less than 48 numbers can be converted into two ESC codes. When the number of the data within one block is 64, the convertible number to the ESC code is any of "0", "1", "2" and "3". After the processing of the head block is finished, the code amount controller 38 determines discriminates whether or not the processing is for the last block within this frame in step 106. If not, the operation is returned to step 101 and the same operation described above is repeated to reach the last block within the frame. When the processing of the last block within the frame is finished, the operation is moved to step 107.

In step 107, the code amount controller 38 calculates the sum F1 of the total code amount of the effective data of the total blocks within the frame including the block or blocks the processing of the effective data is stopped midway in step 102, and compares the obtained sum F1 with the upper limit code amount F0 of one frame. When F1≧F0 in step 107, the code amount control operation is finished, and the code amount controller 38 considers all midway stops of the effective data as effective and instructs the construction of the compressed data using the effective data formed with respect to all blocks including the midway stop blocks to the data construction part 36. When F1<F0 in step 107, the code amount controller 38 relieves or increases the upper limit code amount B0 of one block for the midway stop blocks in step 108. The relief of the upper limit code amount B0 is carried out in the order of the alignment of the midway stop blocks. This relief of the upper limit code amount B0 is repeated until $F1 \geq F0$ in step 107 or it is detected that there becomes no midway stop block arises by relieving the upper limit code amount B0 in step 109.

When $F1 \geq F0$ with the relief of the upper limit code amount B0 in step 107, the code amount controller 38 finishes the code amount control operation and instructs the construction of the compressed data using the effective data formed with respect to all blocks including the relieved midway stop blocks to the data construction part 36. When the code amount controller 38 detects that there is no midway stop block by the relief of the upper limit code amount B0 in step 109, it is determined whether $F1 \geq F0$ or not in step 110. When $F1 \geq F0$ in step 110, the code amount controller 38 finishes the code amount control operation and instructs the construction of the compressed data using the effective data formed with respect to all blocks excluding the midway stop blocks to the data construction part 36.

When $F1 < F0$ in step 110, the code amount controller 38 performs the conversion of the blocks including the convertible continuous ineffective data convertible into the ESC code. This conversion into the ESC code is accomplished practiced as follows. First, after the conversion into the ESC code of the blocks having the maximum convertible numbers is carried out in the block arrangement order in step 111, the code amount controller 38 determines whether or not there is any unconverted block in step 112. When there is the unconverted block or blocks and the code amount controller 38 determines that $F1 < F0$ in step 110, the operation is moved again to step 111, and the conversion into the ESC code of the blocks having the large convertible numbers is carried out in the block arrangement order. The above-described operation is repeated, and every time the conversion into the ESC code is executed, the code amount F1 of the effective data within the frame is increased by a predetermined value, for example, 12 bits in this embodiment. When it is determined that $F1 \geq F0$ in the course of the conversion into the ESC code in step 110, the code amount controller 38 finishes the code amount control operation and instructs the construction of the compressed data to the data construction part 36 in the same manner as described above.

When the conversion into the ESC code for all the blocks is finished and there is no unconverted block in step 112, the code amount controller 38 finishes the code amount control operation and instructs the construction of the compressed data to the data construction part 36 in the same manner as described above.

As described above, according to the present invention, although the code amount control in the code amount controller 38 has been described in combination with the quantization step size control in the quantization step size controller 37, the code amount control by the code amount controller 38 can be carried out independently without combining with the quantization step size control by the quantization step size controller 37 or in combination with another appropriate code amount control method.

In this embodiment, although the present invention has been described in connection with the example of the motion image compression of the frame structure, the present invention can be applied to a still image compression of a frame structure.

In this embodiment, as described above, by the motion image data compression coding of the present invention only or in connection with a variety of data smoothing methods including a conventional quantization step size control or the like, a more effective smoothing of the interframe data can be realized.

Figure 10:
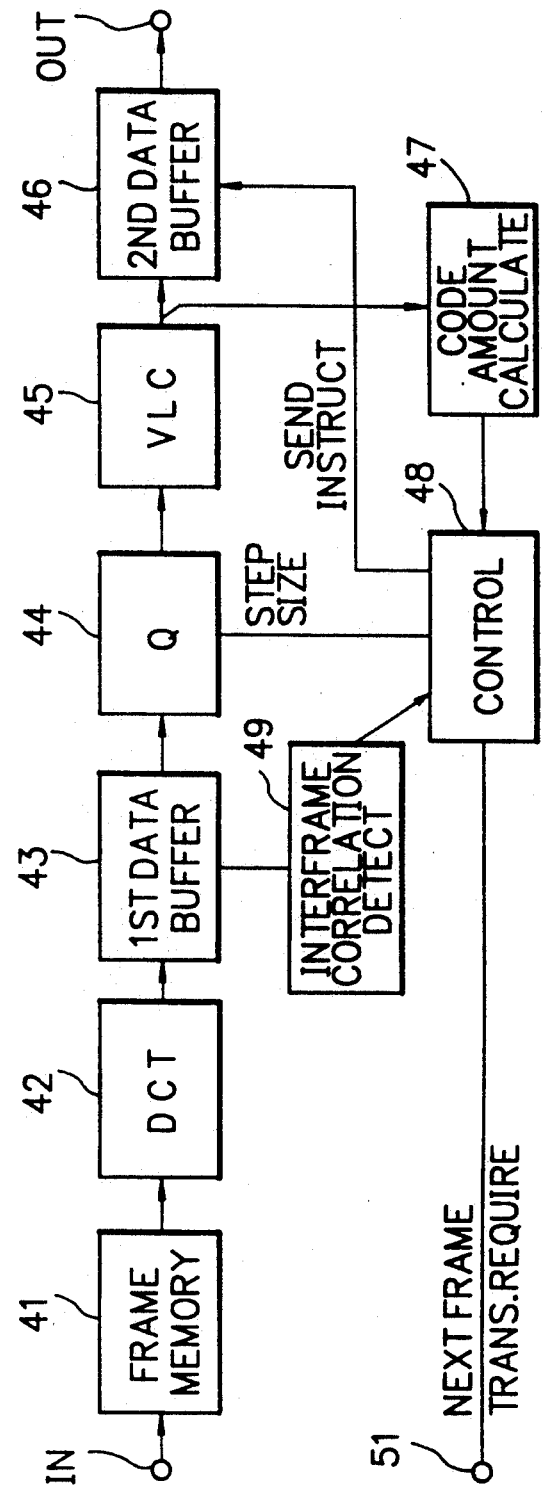
FIG. 10 is a block diagram of a motion image data compression coding apparatus according to a fourth embodiment of the present invention.

In FIG. 10, there is shown the fourth embodiment of the motion image data compression coding apparatus according to the present invention. In this embodiment, the motion image data compression coding apparatus comprises a frame memory 41 coupled with an input terminal IN of motion image data to be compressed, a DCT part 42, a first data buffer 43, a quantization (Q) part 44, a variable length coding (VLC) part 45, a second data buffer 46 connected to an output terminal OUT, a produced code amount calculator 47, a controller 48 connected to another output terminal 51 for a next frame transmission requirement, and an interframe correlation detector 49.

In this embodiment, the controller 48 determines a target value (target code amount) of a produced code amount for one frame and the proper value of the minimum quantization step size as an initial value to the quantization part 44. After finishing the initial value setting of the target code amount and a quantization step size, the controller 48 outputs a next frame transmission requirement to a motion image data supply part of a foregoing stage via the output terminal 51. In response to this transmission requirement, one frame of digital pixel data constituting motion image data to be compressed are transmitted to the frame memory 41 through the input terminal IN and are stored in the frame memory 41.

The DCT part 42 reads one frame of pixel data out of the frame memory 41 which is equally divided into a proper number of blocks, for example, $8 \times 8 = 64$ blocks, and performs a two-dimensional discrete cosine transform of the pixel data contained within each block to obtain a transform coefficient group. The obtained transform coefficient group is stored in the first data buffer 43. The quantization part 44 reads the transform factor group out of the first data buffer 43 and quantizes the transform factor group based on the quantization step size instructed by the controller 48, and the quantized data are sent to the variable length coding part 45. The variable length coding part 45 carries out a variable length coding of the quantized data. That is it allots a shorter code to the quantized data as its appearance frequency is smaller. The obtained variable length coded data are sent to the second data buffer 46 and the produced code amount calculator 47 and are stored in the second data buffer 46.

The produced code amount calculator 47 adds one frame of code amount of the variable length coded data to be written in the second data buffer 46 and outputs the summed value as the produced code amount to the controller 48. The controller 48 compares the produced code amount sent from the produced code amount calculator 47 with a predetermined target code amount. Since the initial value of the quantization step size is set to the minimum value, at the stage that the first quantization and variable length coding are finished, the produced code amount can exceed the target code amount with a sufficient large probability.

The controller 48 increases the quantization step size to be set in the quantization part 44 by a predetermined step and instructs the reprocessing of the quantization and the variable length coding to the quantization part 44 and the variable length coding part 45, respectively. In general, since the appearance frequency becomes higher as the quantization output is low, the shorter code is allotted as output the level is lower in the variable length coding. Hence, when the level of the quantization output is reduced as the quantization step size increases, the code amount of the variable length coded compressed data of the quantization output is reduced. The controller 48 compares the produced code amount obtained with the target code amount, and, when the produced code amount still exceeds the target code amount, after further increasing the quantization step size by the predetermined step, the controller 48 instructs the reprocessing of the quantization and the variable length coding to the quantization part 44 and the variable length coding part 45, respectively.

Figure 11:
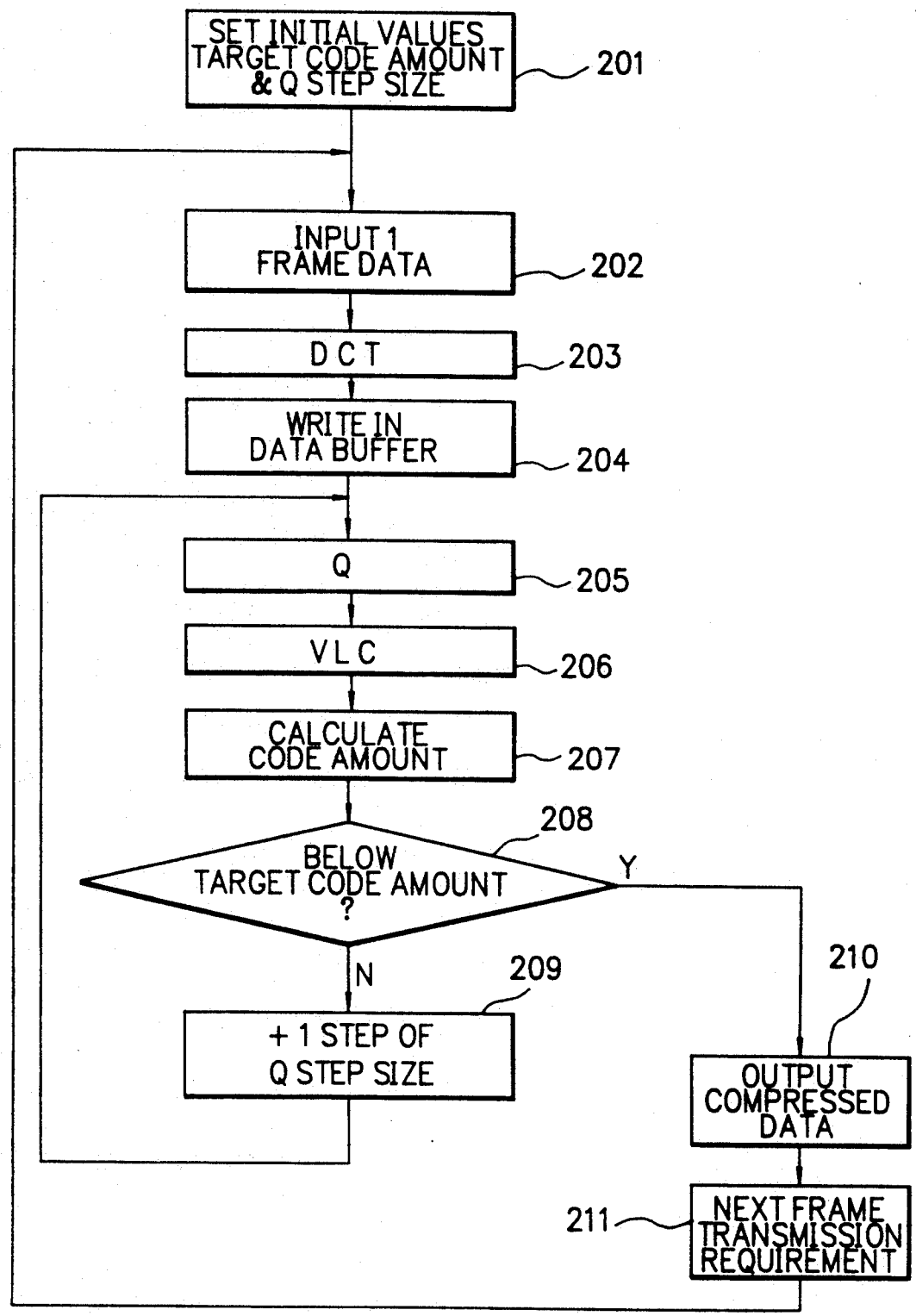
FIG. 11 is a flow chart of a compression coding process carried out in the apparatus shown in FIG. 10.

As described above, by increasing the quantization step size with the predetermined step, the quantization and the variable length coding are repeated until the produced code amount is less than the target code amount. When the produced code amount becomes less than the target code amount, the controller 48 instructs the second data buffer 46 to output the stored data to the output terminal OUT. The controller 48 also determines the initial value of the above-described quantization step size to the quantization part 44 and outputs the next frame transmission requirement to the output terminal 51 in order to start the processing of the next frame. As a result, the compression coding processing of the next frame is carried out in the same manner as described above. FIG. 11 shows the above-described motion image data compression coding process, and steps 201 to 211 indicate the aforementioned basic processing contents.

In this embodiment, as shown in FIG. 10, by adding the interframe correlation detector 49, the reduction of the processing time of the above-described basic processing can be realized. That is, the interframe correlation detector 49 detects the difference between the sums of the absolute values of the AC components of the discrete cosine transform coefficient of the present frame to be compression-coded and the preceding frame compression-coded, and compares the obtained difference with a predetermined value so as to detect whether or not there is correlation between the two frames concerning the pattern. The detected result is sent to the controller 48.

When the interframe correlation detector 49 detects that there is a correlation, in place of the above-described minimum quantization step size setup as the initial value for the present frame, the controller 48 sets the last value of the quantized step size obtained for the preceding frame or a one or through two step step smaller value than the last value as the initial value of the quantization step size. Hence, since the pattern of the present frame is similar to that of the preceding frame, relating to the next frame, it can be presumed that the produced code amount is also the same as the preceding frame, the initial value of the quantization step size is determined to be the large value and the processing time can be reduced. On the other hand, when the interframe correlation detector 49 detects that there is no correlation, for example, due to a large change of the pattern by a scene switching, the interframe correlation detector 49 sets up the initial value of the quantization step size to the above-described minimum value in preparation for a large change of the produced code amount from the preceding frame.

In this embodiment, although the interframe correlation detector 49 is supplemented in order to shorten the processing time, when it is not necessary to reduce the processing time, the interframe correlation detector 49 can be omitted.

In this embodiment, as described above, the smoothing of the produced code amount between the frames can be accurately realized.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A motion image data compression coding apparatus, comprising:

orthogonal transform means for carrying out an orthogonal transform of the motion image data of a frame structure to obtain transform coefficients;

quantization means for quantizing the transform coefficients sent from the orthogonal transform means through a buffer memory with a variable quantization step size to obtain quantized data;

variable length coding means for carrying out a variable length coding of said quantized data to output compressed coded data to an output terminal;

code amount calculator means for calculating a code amount of the compressed coded data produced for every frame;

preceding quantization means for quantizing the transform coefficients of one frame read out of the buffer memory with a second variable quantization step size to obtain second quantized data prior to said quantization of said quantization means and the variable length coding of the variable length coding means;

preceding variable length coding means for carrying out a second variable length coding of said second quantized data to output second compressed coded data;

preceding code amount calculator means for calculating a second code amount of the second compressed coded data produced for every frame;

AC level detector means for detecting an AC level which reflects an amplitude size of the AC components of the transform coefficients for every one frame;

target code amount calculator means for calculating a target code amount as a target value of a code amount per one frame of a frame on the basis of the code amount of the previous frame calculated by the code amount calculator means and an instruction input from an external part;

preceding step size set means for calculating a quantization scaling factor from the calculated value of the target code amount calculator means and the detected value of the AC level detector means for calculating a second quantization step size from a product of the quantization scaling factor and the quantization matrix factors set for the AC components of the transform coefficients, and for sending the second quantization step size to the preceding quantization means; and step size set means for calculating a quantization step size from the calculated value of the target code amount calculator means, the detected value of the AC level detector means and the calculated value of the preceding code amount calculator means and sending the quantization step size to the quantization means.

2. The apparatus as claimed in claim 1, wherein the AC level detector means detects a sum of absolute values of levels of the AC components of the transform coefficients as the AC level.

3. A motion image data compression coding apparatus for compressing a data amount by successively carrying out an orthogonal transform, a quantization and a variable length coding of motion image data of one frame structure, comprising;

AC level detector means for detecting an AC level reflecting an amplitude size of AC components of transform coefficients produced by the orthogonal transform every one frame;

interframe difference detector means for detecting an interframe difference G of the AC level between a preceding frame and a present frame, detected by the AC level detector means;

code amount error detector means for detecting a code amount error difference D between a code amount of compressed coded data produced every frame by the variable length coding and a target code amount as a target value of the code amount;

addition code amount error detector means for adding up the code amount error differences D from a head frame through the present frame to detect an addition code amount error Z;

initial value set means for setting an initial value of a scaling factor f relating to a quantization step size from a combination of the AC level of the detected transform coefficients of the head frame and the target code amount;

scaling factor adjusting means for adjusting the scaling factor f set for the preceding frame on the basis of the code amount error D, the code amount error Z and the interframe difference G; and calculator means for calculating the quantization step size in the quantizing from a product of the scaling factor f adjusted by the scaling factor adjusting means and quantization matrix factors q set for the AC components of the transform coefficients.

4. The apparatus as claimed in claim 3, wherein the AC level detector means detects a sum of absolute values of levels of the AC components of the transform coefficients as the AC level.

5. The apparatus as claimed in claim 3, wherein the scaling factor adjusting means includes an adjusting factor calculator means for calculating an adjusting factor $\alpha$ for adjusting a scaling factor set for the present frame by multiplying the scaling factor f for the preceding frame by $(1+\alpha)$ according to the following formula $$\alpha = D/k1 + Z/k2 + G/k3$$

wherein k1, k2 and k3 are constants.

6. The apparatus as claimed in claim 5, wherein the AC level detector means detects a sum of absolute values of levels of the AC components of the transform coefficients as the AC level.

7. An image data compression coding method for use in an image data compression coding apparatus for compressing a data amount by a hybrid coding of a combination of a block dividing within a frame, a discrete cosine transform within the block, a quantization and a variable length coding of image data of one frame structure, comprising the steps of:

setting an upper limit code amount F0 of one frame and an upper limit code amount B0 of one block according to an instruction input from an external part;

calculating a code amount B1 of effective data except ineffective data including zero data continuing up to a block end by the hybrid coding of the blocks within one frame, and carrying out a midway stop of the effective data for an excess part of each block in which the code amount B1 exceeds the upper limit code amount B0; and adding up all code amounts of the effective data of all blocks within the frame including the midway stop blocks after coding to obtain a total code amount F1 of one frame, comparing the total code amount F1 with an upper limit code amount F0, and either when F1 ≥ F0, carrying out a construction of compressed data by using the formed effective data of all blocks including the midway stop blocks, or when F1 < F0, while the upper limit code amount B0 for the midway stop blocks is increased until either F1 becomes at least F0 or there becomes no midway stop block by the increase of the upper limit code amount B0, carrying out the construction of the compressed data by using the effective data including the increased parts.

8. The method as claimed in claim 7, wherein said calculating step further includes calculating a number of ineffective data groups convertible into effective data (ESC code) of a predetermined code length, the ineffective data groups appearing in the form of a predetermined number of continuing ineffective data within each block, and wherein said adding up step further includes, when the construction of the compressed data of the one frame is finished before the total code amount F1 reach the upper limit code amount F0, converting the ineffective data groups of the block into the effective data (ESC code) until either F1 becomes at least F0 or the construction of the compressed data of the block is finished.

9. A motion image data compression coding apparatus, comprising;

discrete cosine transform means for, while each frame of image data of one frame structure is equally divided into a plurality of blocks, carrying out a discrete cosine transform of pixel data within each block to obtain transform coefficients;

quantization means for quantizing the transform coefficients to obtain quantized data;

variable length coding means for carrying out a variable length coding of the quantized data to obtain compressed coded data;

code amount calculator means for calculating a code amount of the compressed coded data within the frame; and controller means for setting a target code amount of a target value of the code amount and a proper minimum quantization step size for the quantization as initial values, and, while gradually increasing the quantization step size with a predetermined step, repeating the quantization in the quantization means and the variable length coding in the variable length coding means until the code amount becomes at most the target code amount.

10. The apparatus as claimed in claim 9, further comprising interframe difference detector means for detecting an interframe difference of correlation of a pattern between preceding and present frames, wherein, when the detected interframe difference is smaller than a predetermined value, the controller means sets either a last quantization step size obtained for the preceding frame or a predetermined step smaller quantization step size than the last quantization step size as the initial value in place of the minimum step size.

* * * * *